United States Patent
Arapov et al.

(10) Patent No.: US 8,806,504 B2
(45) Date of Patent: Aug. 12, 2014

(54) LEVERAGING PERFORMANCE OF RESOURCE AGGRESSIVE APPLICATIONS

(75) Inventors: Anton Arapov, Vranov (CZ); Jiri Olsa, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 261 days.

(21) Appl. No.: 13/478,874

(22) Filed: May 23, 2012

(65) Prior Publication Data
US 2013/0318534 A1    Nov. 28, 2013

(51) Int. Cl.
*G06F 9/46*    (2006.01)

(52) U.S. Cl.
USPC .......................................... 718/104; 712/229

(58) Field of Classification Search
None
See application file for complete search history.

(56) References Cited

U.S. PATENT DOCUMENTS

| | | | | |
|---|---|---|---|---|
| 7,216,223 B2* | 5/2007 | Michaelis | ..................... | 713/100 |
| 7,500,067 B2* | 3/2009 | Rangarajan et al. | .......... | 711/147 |
| 7,509,643 B2* | 3/2009 | Qiu et al. | ..................... | 718/103 |
| 7,698,540 B2* | 4/2010 | Norton et al. | ................. | 712/228 |
| 8,327,368 B2* | 12/2012 | Mall et al. | ..................... | 718/102 |
| 8,458,709 B2* | 6/2013 | Armstrong et al. | ........... | 718/102 |
| 8,677,371 B2* | 3/2014 | Flemming et al. | ............. | 718/104 |
| 2002/0049802 A1* | 4/2002 | Nakahara et al. | ............. | 709/103 |
| 2006/0242389 A1* | 10/2006 | Browning et al. | ............. | 712/229 |
| 2008/0114973 A1* | 5/2008 | Norton et al. | ................. | 712/228 |
| 2008/0294626 A1* | 11/2008 | Mukherjee | ........................ | 707/5 |

\* cited by examiner

*Primary Examiner* — Emerson Puente
*Assistant Examiner* — Hiren Patel
(74) *Attorney, Agent, or Firm* — Lowenstein Sandler LLP (57) ABSTRACT

A simultaneous multithreading computing system obtains process information for the simultaneous multithreading computing system. The process information comprises a plurality of processes associated with the simultaneous multithreading computing system. The simultaneous multithreading computing system obtains resource information for the simultaneous multithreading computing system. The resource information comprises a plurality of available resources in the simultaneous multithreading system. The simultaneous multithreading computing system determines that a process from the plurality of processes is unscalable on the simultaneous multithreading computing system. Upon determining that the process is unscalable, the simultaneous multithreading computing system selects a resource to execute the unscalable process based on the resource information. Upon determining that a sibling resource is associated with the selected resource, the simultaneous multithreading computing system disconnects the sibling resource.

16 Claims, 5 Drawing Sheets

LEVERAGING PERFORMANCE OF RESOURCE AGGRESSIVE APPLICATIONS

TECHNICAL FIELD

Embodiments of the present invention relate to load balancing applications, and more particularly, to a technique for leveraging performance of resource aggressive applications.

BACKGROUND

Most modern computing systems, such as desktops and servers, include several features to improve performance and speed of the systems and the applications running on the systems. These features can include multiprocessing, multiple independent caches, and simultaneous multithreading.

Multiprocessing is the use of two or more processors (central processing units, or CPUs) within a single computing system. Multiprocessing can be supported by including multiple physical processors in the computing system, or including one or more multi-core processors in the computing system. A multi-core processor can be a single computing component with two or more independent actual processors (called "cores"). The cores can be the processing units that read and execute instructions. The multiple cores can run multiple instructions at the same time, increasing overall speed for applications that are amenable to multiprocessing (e.g., applications that can be run using parallel execution). Multiprocessing systems can further implement virtual processors, such that each physical processor can appear as multiple virtual processors to an operating system in the computing system. The operating system can execute and schedule processes to the virtual processors as if each virtual processor is a physical processor. In fact, however, the virtual processors share one or more physical processors.

A cache can be a smaller, faster memory which stores copies of data from the most frequently used main memory locations. Caches can be used in order to reduce the average time to access memory. Multiple independent caches in a computing system usually include at least an instruction cache, a data cache, and a translation lookaside buffer (TLB). The instruction cache can be used to speed up executable instruction fetch. The data cache can be used to speed up data fetch and store. The TLB can be used to speed up virtual-to-physical address translation for both executable instructions and data instructions. A computing system can further improve performance by including multiple levels of cache, with small fast caches backed up by larger slower caches. Multi-level caches generally operate by checking the smallest level 1 (L1) cache first. If it hits, the processor proceeds at high speed. If the L1 cache misses, the next larger cache (L2) is checked, etc., before external memory is checked.

Most modern computing systems further support simultaneous multithreading in order to improve performance of the systems. Simultaneous multithreading can improve parallelization of computations (doing multiple tasks at once) performed on a processor by duplicating certain sections of the processor (e.g., the sections that store the architectural state) without duplicating other sections of the processor (e.g., the main execution resources). This usually allows the multithreading processor to appear as multiple "logical" processors (or virtual processors) to the host operating system, allowing the operating system to schedule multiple threads or processes simultaneously by allocating one or more processes to each logical processor. When execution resources would not be used by a process executed by a logical processor, and especially when the logical processor is stalled (e.g., due to a cache miss, branch misprediction, data dependency, etc.), the multithreading processor can use the execution resources to execute another scheduled process.

In a computing system with multiple levels of caches, multiprocessing, and simultaneous multithreading, the multiple virtual logical processors typically share the caches. However, this sharing may result in cache thrashing depending on the applications executed on the multiple logical or virtual processors. Cache thrashing usually occurs when main memory is accessed in a pattern that leads to multiple main memory locations competing for the same cache lines, resulting in excessive cache misses and slower performance (longer latency).

Significant cache thrashing can occur in current multithreading computing systems that run cache-aggressive applications (e.g., older applications that were not written with multithreading in mind, applications that use compression algorithms, etc.).

BRIEF DESCRIPTION OF THE DRAWINGS

Various embodiments of the present invention will be understood more fully from the detailed description given below and from the accompanying drawings of various embodiments of the invention.

DETAILED DESCRIPTION

Embodiments of the invention are directed to a method and system for leveraging performance of resource aggressive applications. A simultaneous multithreading computing system that is running resource aggressive applications (e.g., older applications that were not written with multithreading in mind, applications that use compression algorithms, etc.) may experience significant cache thrashing. The simultaneous multithreading system may utilize a system daemon to balance the resource aggressive applications across system resources such that the cache thrashing is minimized.

The system daemon can obtain resource information and process information for the simultaneous multithreading system. The resource information may include information about the topology of the simultaneous multithreading system, the available resources, the physical or logical distance between the resources, etc. The process information may include information about the applications or processes currently executing on the simultaneous multithreading system, the manually allocated processes to desired system resources, the behavior of the daemon, etc. Based on the resource information, the system daemon can allocate resources to the processes.

As the system is running, the system daemon can obtain measurements for each process running on the system and redistribute, or rebalance, the processes over the resources based on the measurements. In one embodiment, the system daemon rebalances the processes by determining the manually allocated processes and allocating each manually allocated process to its own resource. The system daemon can determine that a process (or application) running on the system is unscalable and can select a resource available to the system daemon to execute the unscalable process based on the resource information. If the selected resource is associated with a sibling resource (e.g., the selected resource and the sibling resource share a cache), the system daemon can disconnect or update the available resources of the system such that no processes or applications can be allocated to the sibling resource (e.g., offline the sibling resource). By limiting the applications or processes running on a resource or associated with a resource, the cache associated with the resource does not have as many applications or processes accessing it. Therefore, the thrashing of the cache is reduced and the performance of the applications or processes is improved.

Figure 1:
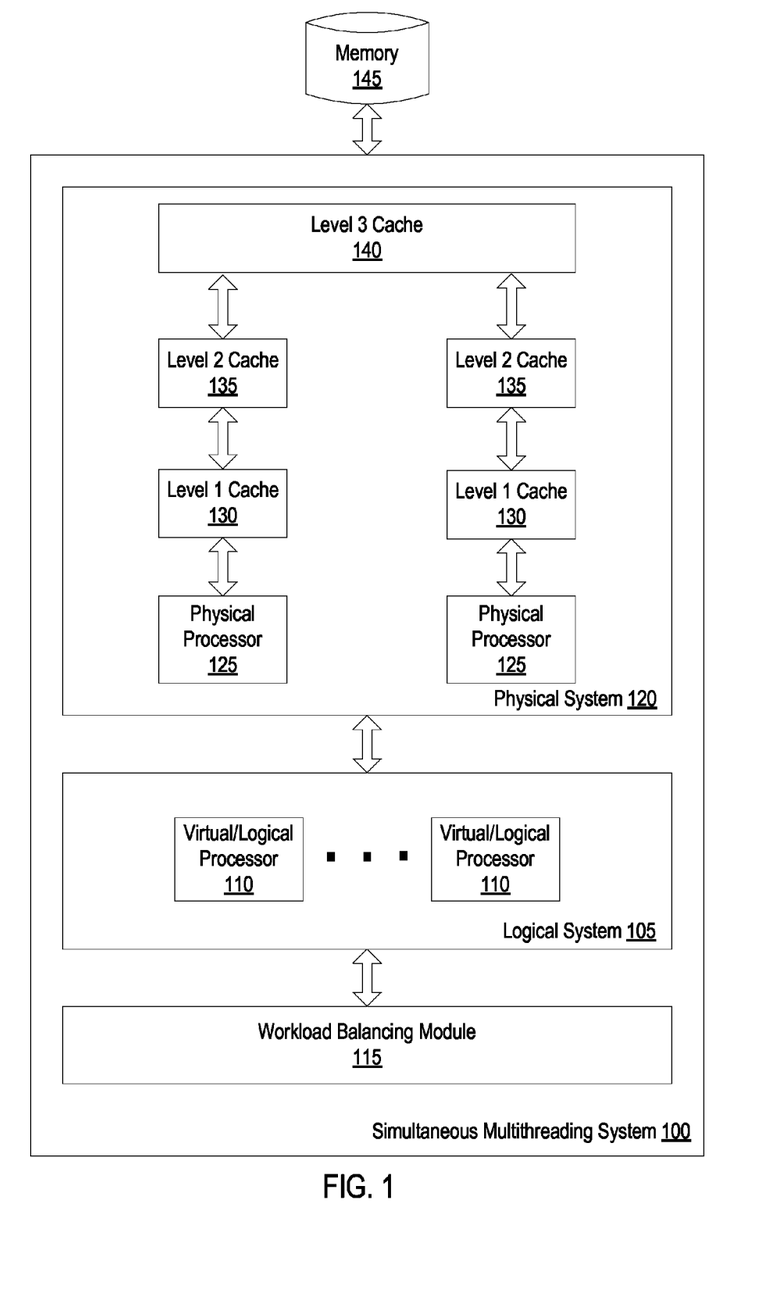
FIG. 1 illustrates exemplary system architecture, in accordance with various embodiments of the present invention.

FIG. 1 illustrates an exemplary simultaneous multithreading system 100 in which embodiments can be implemented. Simultaneous multithreading system 100 may include a computing device that has a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine.

Memory 145 is a persistent storage that is capable of storing data that is collected from data sources. Examples of data sources can include, and are not limited to, desktop computers, laptop computers, handheld computers, server computers, gateway computers, mobile communications devices, cell phones, smart phones, or similar computing device. In some embodiments, memory 145 might be a network-attached file server, while in other embodiments administration memory 145 might be some other type of persistent storage such as an object-oriented database, a relational database, and so forth. Memory 145 may be part of the simultaneous multithreading system 100 or coupled to the simultaneous multithreading system 100 directly or via a network.

The data in the memory 145 can include data related to the simultaneous multithreading system 100. Examples of data related to the simultaneous multithreading system 100 can include, and are not limited to, resource information for the simultaneous multithreading system 100, process information for the simultaneous multithreading system 100, last state data, process measurements for the processes in the simultaneous multithreading system 100, and any other electronically stored information that can be associated with a simultaneous multithreading system, etc.

The resource information in memory 145 can include information about the topology of the simultaneous multithreading system 100. The topology of the simultaneous multithreading system 100 can define the interconnections of the resources of the simultaneous multithreading system 100. In one embodiment, the resource information in memory 145 can include the available resources in the simultaneous multithreading system 100. In one embodiment, the resource information in memory 145 can define the resources in the simultaneous multithreading system 100, such as the components in logical system 105, physical system 120, etc. The resource einformation in memory 145 can include the physical or logical distance between the resources. The physical distance between a first resource and a second resource can be the measured physical distance between the first resource and the second resource as measured on a circuit board on which the simultaneous multithreading system 100 is built. The logical distance between a first resource and a second resource can be the distance that data has to travel to get from the first resource to the second resource. In an alternate embodiment, the resource information in memory 145 can include a location in the topology of simultaneous multithreading system 100 of each resource. The location can represent a physical location (e.g., X-Y coordinate) on a circuit board on which the simultaneous multithreading system 100 is built.

The process information in memory 145 can include information about the applications or processes currently executing on the simultaneous multithreading system 100. In one embodiment, the process information in memory 145 can include processes that have been manually allocated to desired resources in the simultaneous multithreading system 100. A manually allocated process can be a resource that has been assigned to a particular resource by a user, such as a system administrator. In one embodiment, the process information in memory 145 can include a desired policy or behavior for workload balancing.

During operation of the simultaneous multithreading system 100, the simultaneous multithreading system can have many processes executing on it, which can cause cache thrashing, a reduction in performance, etc. In one embodiment, the simultaneous multithreading system 100 can include a logical system 105, a workload balancing module 115, and a physical system 120.

The workload balancing module 115 can obtain resource information and process information for the simultaneous multithreading system 100. In one embodiment, the resource information and the process information are obtained from memory 145. The workload balancing module 115 can balance the processes in the processes information over the resources in the simultaneous multithreading system 100 based on the resource information. In one embodiment, the workload balancing module 115 allocates each process in the process information to one or more resource in the logical system 105, such as one or more virtual/logical processors 110, to execute the process. In an alternate embodiment, the workload balancing module 115 allocates each process in the process information to one or more resources in the physical system 120, such as one or more physical processors 125, to execute the process. In another alternate embodiment, the workload balancing module 115 updates a scheduling routine used by an operating system to allocate the processes in the process information. In this embodiment, the workload balancing module 115 can remove one or more resources from the scheduling routine if the workload balancing module 115 determines that one or more processes in the process information should not share resources. In this embodiment, the workload balancing module 115 can disable one or more of the resources (e.g., virtual/logical processor 110) and remove the disabled resource from the scheduling routine. In one embodiment, the workload balancing module 115 uses an Application Programming Interface (API) to allocate the processes to the one or more resources.

As the simultaneous multithreading computing system 100 runs, and executes the processes, the workload balancing module 115 can obtain measurements about the executing processes. In one embodiment, the measurements about the executing processes are obtained from memory 145. In an alternate embodiment, the measurements about the executing processes are obtained from an operating system (not shown) using an interface to the operating system, such as an Application Programming Interface (API). The workload balancing module 115 can rebalance the processes by determining the manually allocated processes from the process information and allocating each manually allocated process to its own resource, such as one of the virtual/logical processors 110 or one of the physical processors 125.

The workload balancing module 115 can further rebalance the processes by determining that a process running on the simultaneous multithreading system 100 is unscalable and therefore should not share a resource with another process running on the simultaneous multithreading system 100. Upon determining that a process is unscalable, the workload balancing module 115 can select a (different) resource to execute the process based on available resources in the resource information. Once the resource is selected, the workload balancing module 115 can determine if the selected resource has one or more sibling resources and disconnect or offline the sibling resources. In one embodiment, if the selected resource is a virtual/logical processor 110, a sibling resource is another virtual/logical processor 110 that executes on the same physical processor 125 as the selected virtual/logical processor 110. In this embodiment, because the selected resource and the sibling resource share a physical processor 125, the selected resource and the sibling resource also are likely to share a cache (e.g., level 1 cache 130, level 2 cache 135, level 3 cache 140, etc.), which is likely to get thrashed because the selected resource is running an unscalable process. In an alternate embodiment, if the selected resource is a physical processor 125, a sibling resource is another physical processor 125 that shares the same level 1 cache 130 and/or level 2 cache 135 and/or level 3 cache 140, which are likely to get thrashed because the selected resource is running an unscalable process. By offlining the sibling resource, cache thrashing is reduced because the selected resource is less likely to share a cache with another resource.

Figure 2:
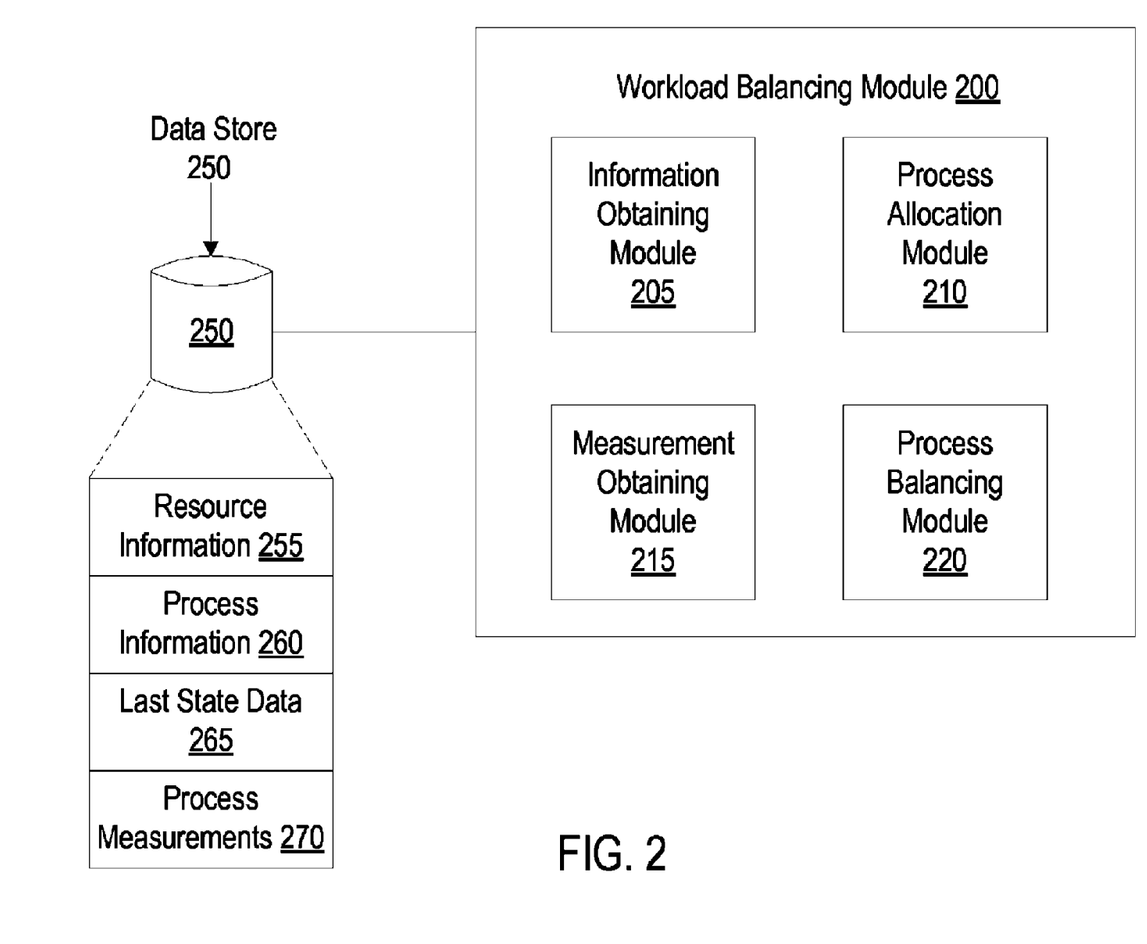
FIG. 2 is a block diagram of a process allocation module, in accordance with an embodiment.

FIG. 2 is a block diagram of a workload balancing module 200, in accordance with one embodiment of the present invention. The workload balancing module 200 includes an information obtaining module 205, a process allocation module 210, a measurement obtaining module 215, and a process balancing module 220. Note that in alternative embodiments, the functionality of one or more of the information obtaining module 205, the process allocation module 210, the measurement obtaining module 215, and the process balancing module 220 may be combined or divided.

The information obtaining module 205 can obtain resource information 255, process information 260, and last state data 265 for a simultaneous multithreading system from data store 250. Resource information 255, process information 260, and last state data 265 can be collected and stored by an operating system (not shown). Resource information 255 can include information about the topology of the simultaneous multithreading system, such as all available resources, a physical or logical location for each resource, and sibling information for resources that have one or more siblings. Process information 260 can include information about the applications or processes currently executing on the simultaneous multithreading system. Last state data 265 can include process balancing information, state information, and/or resource information from the previous run of the simultaneous multithreading system (e.g., before the system was last restarted). The process balancing information, state information, and/or resource information can define the allocation of resources to processes during a previous run of the system (e.g., process X was assigned to resource Y, process A was assigned to resource B, etc.).

The process allocation module 210 can allocates resources to the processes in the process information based on the resource information 255 and the last state data 265. In one embodiment, the process allocation module 210 allocates all of the manually allocated processes to the resource identified for the process in the process information 260 and updates the resource information 255 to indicate that the resource is no longer available for allocation (e.g., deletes the resource from the resource information 255). In one embodiment, if the last state data 265 was obtained, the process allocation module 210 allocates each process that is also included in the last state data 265 to the same resource that it was previously allocated to in the last state data 265, if that resource is available in the resource information 255.

The measurement obtaining module 215 can obtain process measurements 270 for each process running on the simultaneous multithreading system from data store 250. Process measurements 270 can include the amount of pressure that the process puts on a processor executing it, such as the input/output (I/O) activity for a process, the number of data accesses made by a process, etc. Process measurements 270 can be collected and stored by an operating system (not shown).

The process balancing module 220 can balance the processes over the resources based on the measurements obtained by the measurement obtaining module 215. The process balancing module 220 can determine whether any of the processes are manually allocated based on the process information 260 and can allocate each manually allocated process to its own resource. In one embodiment, each manually allocated process is allocated to the resource identified for the manually allocated process in the process information 260. In an alternate embodiment, the resource is allocated to another available resource identified in the process information 260. In one embodiment, the process balancing module 220 updates the resource information 255 based on the allocation of the manually allocated processes.

The process balancing module 220 can determine whether any of the processes are unscalable, can allocate each unscalable process to its own resource, and if the resource allocated to an unscalable process has a sibling resource, can disconnect or offline the sibling resource. In one embodiment, the process balancing module 220 can allocate each unscalable process to its own resource and maximize the distance between the allocated resources. The process balancing module 220 can access the resource information 255 to determine a distance between available resources, and select resources to allocate each unscalable process to resources whose distance is greatest. The distance can be measured using hops, latency, bandwidth, etc. For example, resource A, resource B, and resource C are available for allocation, unscalable process X and unscalable process Y need to be allocated, and the distance between resource A and resource B is 1 hop, the distance between resource A and resource C is 2 hops, and the distance between resource B and resource C is 3 hops. The process balancing module 220 can allocate unscalable process X to resource B and unscalable process Y to resource C because the distance between resource B and resource C is the largest distance between the available resources. In another example, resource A, resource B, and resource C are available for allocation and a particular range of memory is 2 hops from the available resources A and B and a SCSI controller. In this example, the available resources A and B and the SCSI controller are determined to be on the same node. An unscalable process X allocated to either available resource A or B would cause an unscalable process Y to be allocated to resource C (on a different node) in order to maximize the distance between the available resources.

In one embodiment, a process is unscalable if the process cannot be executed using more than one resource (no parallel processing possible). For example, tools for compressing and archiving data, such as tar, gzip, and bzip2, do not allow parallel processing due to the implementation of these tools. In another embodiment, a process is unscalable if the process puts pressure on the resource associated with the process. For example, networking applications that have large loads (traffic) put pressure on the processor executing them and memory due to a large number of cache and memory accesses. Another example of unscalable processes are applications that use all memory available to a resource.

The scalability of a process can be determined by comparing process measurements 270 for the process (e.g., number of cycles the process has been running, number of I/O accesses, number of memory page faults, number of caches that it occupies and/or the amount of memory it uses, etc.) to a predetermined threshold. If the process measurements 270 for the process exceed the predetermined threshold, the process can be found to be unscalable. For example, if the process measurements for a process X indicate that the number of memory page faults for process X is 10, and the predetermined threshold for the number of memory page faults allowed for a process is 5, the process measurements for process X will be found to exceed the predetermined threshold, and process X will be found to be unscalable.

In one embodiment, an allocated resource has a sibling resource if the allocated resource and the sibling resource share a cache. In this embodiment, the allocated resource and the sibling resource are found to share a cache by obtaining cache information for the allocated resource and the sibling resource from the resource information 255 and comparing the cache information. If the cache(s) used by the allocated resource and the cache(s) used by the sibling resource are the same, the allocated resource can be found to have a sibling resource. If the cache(s) used by the allocated resource and the cache(s) used by the sibling resource are not the same, the allocated resource can be found to not have a sibling resource. In an alternate embodiment, an allocated resource has a sibling resource if the resource information 255 lists a sibling resource for the allocated resource.

In one embodiment, offlining one or more sibling resources can be performed by updating the resource information such that the one or more sibling resources are no longer available for allocation. For example, the one or more sibling resources are removed from the resource information. In an alternate embodiment, offlining one or more sibling resources is performed by determining one or more sibling resources for a resource allocated to an unscalable resource and using an operating system feature (e.g., Linux offline capability, application programming interface (API), system call, etc.) to disconnect or offline the determined one or more sibling resources. In one embodiment, the operating system feature is used by sending a command for the operating system feature to the operating system. For example, the Linux procfs command is sent to the operating system with a CPU ID to offline the CPU with the specified CPU ID. In one embodiment, the process balancing module 220 updates the resource information 255 based on the allocation of the unscalable processes.

The process balancing module 220 can determine whether any of the processes share resources based on the resource information 255. In some embodiments, the process balancing module 220 also uses process information 260 and process measurements 270 to determine whether any of the processes share resources. The process balancing module 220 can allocate the processes to minimize the distance between the allocated resources. In one embodiment, the process balancing module 220 updates the resource information 255 based on the allocation of the processes that share resources.

The process balancing module 220 can determine resources for the remaining processes (that do not share resources) based on the resource information 255. In some embodiments, the process balancing module 220 also uses process information 260 and process measurements 270 to determine resources for the remaining processes. The process balancing module 220 can allocate the processes to maximize the distance between the allocated resources. In one embodiment, the process balancing module 220 updates the resource information 255 based on the allocation of the remaining processes that do not share resources.

Figure 3:
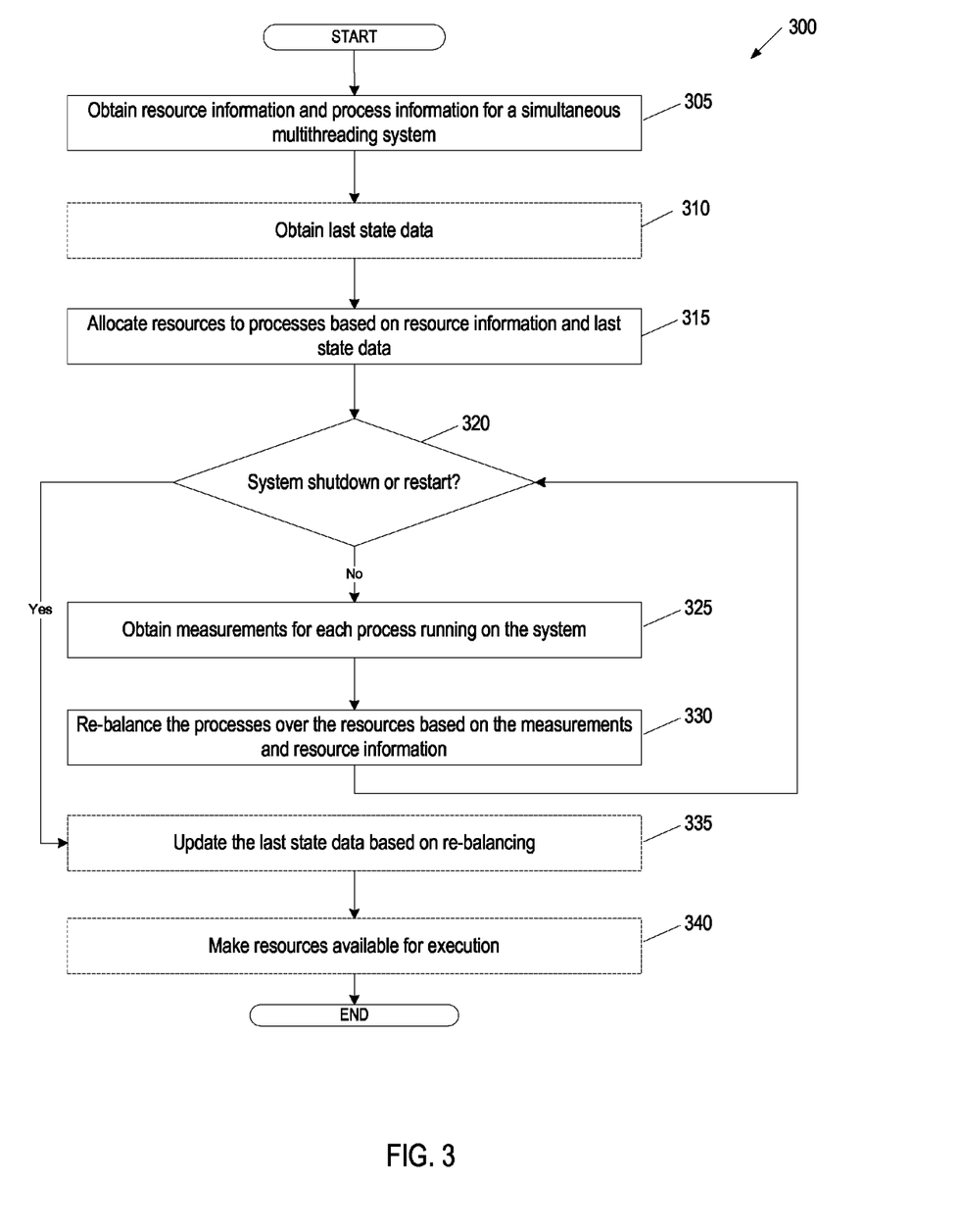
FIG. 3 is a flow diagram illustrating an embodiment for a method of leveraging performance of resource aggressive applications, in accordance with an embodiment.

FIG. 3 is a flow diagram of an embodiment of a method 300 for method of leveraging performance of resource aggressive applications on a simultaneous multithreading system. The method 300 is performed by processing logic that may comprise hardware (circuitry, dedicated logic, etc.), software (such as is run on a general purpose computer system or a dedicated machine), or a combination of both. In one embodiment, the method 300 is performed by the workload balancing module 200 of FIG. 2.

At block 305, processing logic obtains resource information and process information for a simultaneous multithreading system. In one embodiment, processing logic obtains resource information and process information in response to a user request to balance processes on the simultaneous multithreading system. In an alternate embodiment, processing logic obtains resource information and process information at a predetermined time of day (e.g., everyday at midnight). In another alternate embodiment, processing logic obtains resource information and process information at predefined intervals (e.g., every 24 hours). In one embodiment, the resource information is obtained by accessing a predefined location in a memory associated with the simultaneous multithreading system. In an alternate embodiment, the resource information is obtained by submitting a request to an operating system running on the simultaneous multithreading system and receiving the resource information from the operating system. The process information may be obtained from an operating system (e.g., Linux® operating system, Windows® operating system, etc.) running on the simultaneous multithreading system. In another alternate embodiment, the resource information is obtained from the operating system by using an API to read the processes from the operating system. In another alternate embodiment, the resource information is obtained by using an API to read the resource information from a Basic Input-Output System (BIOS).

In some embodiments, the resource information may include information about the topology of the simultaneous multithreading system. For example, the resource information can include a list of all the resources present on the simultaneous multithreading system, such as the virtual CPUs, the physical CPUs, the cache information, the memory information, etc. In some embodiments, the resource information may also include the available resources of the simultaneous multithreading system, such as the virtual CPUs that are currently not executing a process or application, and therefore available for scheduling. In addition, in some embodiments, the resource information may also include a physical or logical distance between the physical resources. In one embodiment, the distance between physical resources (ex: distance between one physical CPU and another physical CPU, distance between a physical CPU and a memory, distance between a level 1 cache and a memory, distance between a level 2 cache and a memory, distance between a level 3 cache and a memory, etc.) is based on routing information for the simultaneous multithreading system.

In some embodiments, the process information may include information about the applications or processes currently executing on the simultaneous multithreading system. In some embodiments, the process information may include identification information for each process to be manually allocated in the system and the resource to be allocated for each manually allocated process. For example, an administrator that would like process A to run on processor A would include this mapping of process to resource in the process information. In some embodiments, the process information can include process data for each process currently executing on the simultaneous multithreading system, such as the number of input/output (I/O) accesses, data accesses, number of cycles that the process has run, number of memory page faults, number of caches that it occupies and/or the amount of memory it uses, etc. In some embodiments, the process information includes policy information for the simultaneous multithreading system defining the way that the resources should be allocated in the system. For example, the policy information may require that the simultaneous multithreading system always have free resources, utilize all available resources, etc.

At optional block 310, processing logic obtains last state data for the simultaneous multithreading system. The last state data may be obtained by accessing a predefined location in a memory associated with the simultaneous multithreading system to read a file with the last state data. The last state data may include process balancing information, state information, and/or resource information from the previous run of the simultaneous multithreading system (e.g., before the system was last restarted).

At block 315, processing logic allocates resources to the processes in the process information based on the resource information and the last state data. In one embodiment, processing logic allocates all of the manually allocated processes to the resource identified for the process in the process information and updates the resource information to indicate that the resource is no longer available for allocation (e.g., deletes the resource from the resource information). In one embodiment, if the last state data was obtained, processing logic allocates each process that is also included in the last state data to the same resource that it was previously allocated to in the last state data, if that resource is available in the resource information.

At block 320, processing logic determines if the simultaneous multithreading system has been shutdown or restarted. In one embodiment, the simultaneous multithreading system determines that the system has been shutdown by determining if the simultaneous multithreading system is executing one or more of the processes in the process information. In one embodiment, the simultaneous multithreading system determines that the system has been restarted by obtaining this information from an operating system. If the simultaneous multithreading system has been shutdown or restarted, the method 300 continues to block 335. If the simultaneous multithreading system has not been shutdown or restarted, the method 300 continues to block 325.

At block 325, processing logic obtains measurements for each process running on the simultaneous multithreading system. In one embodiment, the measurements for each process are obtained from the operating system of the simultaneous multithreading system. The measurements can reflect the amount of pressure that the process puts on a processor executing it, such as the input/output (I/O) activity for a process, the number of data accesses made by a process, the number of memory page faults, the number of caches that it occupies and/or the amount of memory it uses, etc. In one embodiment, the measurements are used to identify similar processes that share the same resources. In this embodiment, the measurements include the resources used by each process, and the resource information for each process is compared to determine the processes that share the same resources.

At block 330, processing logic balances the processes over the resources based on the measurements for each process and the resource information. One embodiment of a method for balancing the processes over the resources based on the measurements and the resource information is described in greater detail below in conjunction with FIG. 4. Once the processes have been balanced over the resources, the resource information can be updated to reflect the updated allocation of processes to resources (e.g., remove the resources that are being used by the re-balanced processes) and the process returns to block 320 to determine if the system is still running.

At optional block 335, processing logic updates the last state data based on the balancing. The file storing the last state data may be updated to reflect the allocation of processes to resources.

At optional block 340, processing logic makes resources available for execution. The resources that should be placed online can be determined by obtaining information about the topology of the simultaneous multithreading system and comparing the topology information to the resource information in order to see which resources have been disconnected or offlined due to re-balancing. In one embodiment, the resources included in the topology of the simultaneous multithreading system that are not in the resource information are placed online by adding the resources back to the resource information. In an alternate embodiment, the resources are placed online by copying the topology of the simultaneous multithreading system to the resource information.

Figure 4:
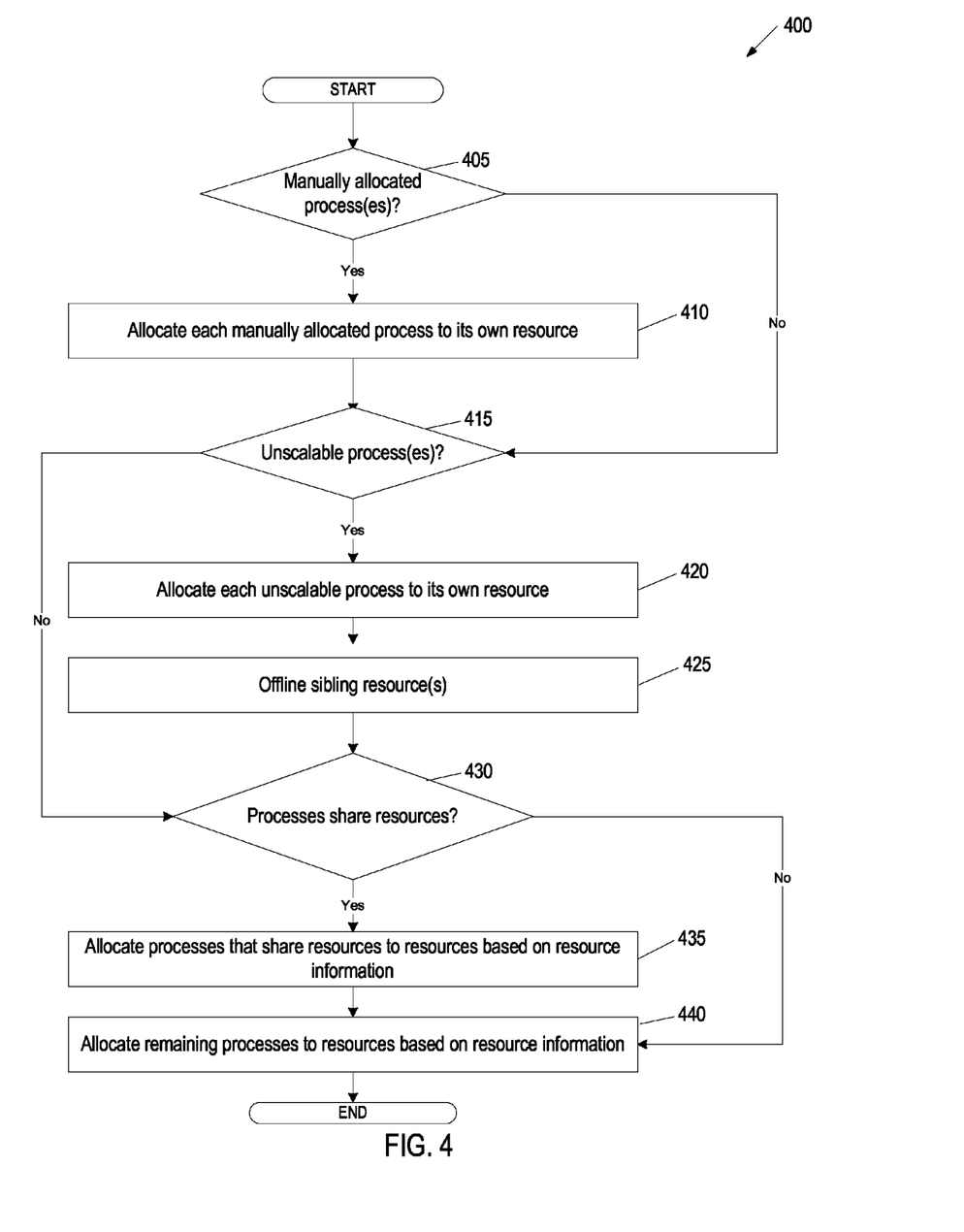
FIG. 4 is a flow diagram illustrating an embodiment for balancing processes over resources based on process measurements, in accordance with an embodiment.

FIG. 4 is a flow diagram of an embodiment of a method 400 for balancing processes over resources based on measurements obtained from a simultaneous multithreading system. The method 400 is performed by processing logic that may comprise hardware (circuitry, dedicated logic, etc.), software (such as is run on a general purpose computer system or a dedicated machine), or a combination of both. In one embodiment, the method 400 is performed by the workload balancing module 200 of FIG. 2.

At block 405, processing logic determines whether any of the processes included in the process information are manually allocated. As discussed above, the process information may include which processes should be manually allocated and a corresponding resource to use for the manually allocated process. The determination of whether any of the processes included in the process information are manually allocated may be made by accessing the process information and obtaining the manually allocated processes from the process information. If there are no manually allocated processes in the process information (e.g., none included by an administrator, the manually allocated processes have already been allocated, etc.), the method 400 continues to block 335. If there is one or more manually allocated processes in the process information, the method 400 continues to block 330.

At block 410, processing logic allocates each manually allocated process to its own resource. In one embodiment, the resource information is updated to indicate that the allocated resource is no longer available for allocation (e.g., by deleting the resource from the resource information, by turning on a flag that indicates that the resource is unavailable, etc.), such that the resource cannot be allocated to another process and can be utilized solely for the manually allocated process. In one embodiment, the manually allocated process is allocated to the resource identified for the manually allocated process in the process information. In an alternate embodiment, the resource is allocated to an available resource identified in the process information.

At block 415, processing logic determines whether any of the processes included in the process information are unscalable. In one embodiment, a process is unscalable if the process cannot be executed using more than one process (no parallel processing possible). In another embodiment, a process is unscalable if the process puts pressure on the resource associated with the process. The scalability of a process can be determined by comparing data from the measurement data (e.g., number of cycles the process has been running, number of I/O accesses, number of memory page faults, number of caches that it occupies and/or the amount of memory it uses, etc.) to a predetermined threshold (e.g., set by an administrator of the simultaneous multithreading system). If the data from the measurement data exceeds the predetermined threshold, the process can be found to be unscalable. If the data from the measurement data does not exceed the predetermined threshold, the process can be found to be scalable. For example, if the number of cycles that the process has been executing is more than a predetermined threshold of cycles, the process is determined to put pressure on the resource, and is found to be unscalable. In another example, if the process is making more I/O accesses than a predetermined threshold of I/O accesses, the process is determined to put pressure on the resource, and is found to be unscalable. In yet another example, if the number of memory page faults for a process is more than a predetermined threshold of memory page faults, the process is determined to put pressure on the resource, and is found to be unscalable. In an alternate example, if the number of caches occupied by a process is more than a predetermined threshold number of caches, the process is determined to put pressure on the resource, and is found to be unscalable. In one example, if the amount of memory used by a process is above a predetermined threshold of memory usage, the process is determined to put pressure on the resource, and is found to be unscalable. If a process included in the process information is not determined to be unscalable, the process continues to block 430. If a process included in the process information is determined to be unscalable, the method 400 continues to block 420.

At block 420, processing logic allocates each unscalable process to its own resource. In one embodiment, the resource is a logical or virtual processor that will execute the process. In an alternate embodiment, the resource is a physical processor that will execute the process. Each unscalable process is allocated to its own resource by accessing the resource information to determine the available resources in the resource information and determining the best available resource to allocate each unscalable process to. In one embodiment, the resource information is updated to indicate that the allocated resource is no longer available for allocation (e.g., by deleting the resource from the resource information, by turning on a flag that indicates that the resource is unavailable, etc.).

In one embodiment, the best available resource to allocate each unscalable process to is selected to maximize the distance between the allocated resources. In this embodiment, the distance between the resources can be determined using distance or layout data for the simultaneous multithreading system (e.g., in the resource information). Using the layout, routing, and/or location of the resources, processing logic can determine a distance from each available resource to another available resource. Processing logic can allocate the unscalable processes to the resources to maximize the distance between the allocated resources. For example, a simultaneous multithreading system executes two unscalable processes, process A and process B, and includes four resources resource 1, resource 2, resource 3, and resource 4, with the resource information indicating that resource 1 is in the right top corner of the motherboard, resources 2 and 3 are in the middle of the motherboard, and resource 4 is in the bottom left hand corner of the motherboard. In this example, when processing logic determines the allocation of the resources for process A and process B, it can select resource 1 for process A and resource 2 for process B, given that the distance from the top right corner of the motherboard and the bottom left corner of the motherboard maximizes the distance between the two processes.

By allocating each unscalable process to its own resource, the process will not have to share a resource with another unscalable process, and therefore is less likely to have to share a cache with another unscalable process (e.g., L1 cache). The likelihood of cache thrashing can therefore be reduced since only one unscalable process will likely be accessing the cache. In addition, by maximizing the distance between the resources allocated for unscalable processes, the unscalable processes are less likely to have to share a cache, since resources that are far away from each other are less likely to share a cache (e.g., L2 cache). Moreover, because unscalable processes are known to not share resources, resources that are close to each other can be saved for allocation to other processes that do share resources.

At block 425, processing logic disconnects or offlines one or more sibling resources associated with the resources allocated to unscalable processes. In one embodiment, offlining one or more sibling resources can be performed by updating the resource information such that the one or more sibling resources are no longer available for allocation. In an alternate embodiment, offlining one or more sibling resources is performed by determining one or more sibling resources for a resource allocated to an unscalable resource and using an operating system feature (e.g., Linux offline capability, application programming interface (API), system call, etc.) to disconnect or offline the determined one or more sibling resources.

In some embodiments, sibling resources are two or more physical processors that share a cache (L1, L2, L3, etc.). In these embodiments, the two or more physical processors are found to share a cache by obtaining cache information for the two or more physical processors from the resource information and comparing the cache information. If the cache(s) used by the two or more physical processors are the same, the two or more physical processors can be found to be sibling resources. If the cache(s) used by the two or more physical processors are not the same, the two or more physical processors are not found to be sibling resources. In some embodiments, sibling resources are two or more virtual processors that execute processes on the same physical processor. In these embodiments, the sibling resources can be determined by comparing the central processing unit identification (CPUIDs) of the physical processors used by the virtual processors, by comparing the CPUIDs and a distance between the physical processors, etc. In some embodiments, sibling resources are two or more logical processors that execute processes on the same multithreading physical processor. In some embodiments, sibling resources are two or more physical processors that are listed in the resource information as sibling resources. Therefore, even though an unscalable process may be allocated to its own resource (physical processor, virtual processor, or logical processor), two or more unscalable processes may still share a cache, either because the processes are executing on sibling resources that share a physical processor with access to that cache or because the sibling resources are physical processors that share the cache. By offlining the one or more sibling resources of each resource allocated to an unscalable process, the unscalable process will be allocated to a resource that is not sharing a cache with another resource, and therefore cache trashing can be prevented.

At block 430, processing logic determines whether any of the processes included in the process information share resources, such as CPUs, caches, RAM, peripheral hardware, etc. In one embodiment, the determination of whether any of the processes included in the process information share resources is determined by obtaining this information from the resource information or system topology information. In an alternate embodiment, the determination of whether any of the processes included in the process information share resources is known based on measurement data, as described above. If no processes share resources, the method 400 continues to block 440. If there are processes that share resources, the method 400 continues to block 435.

At block 435, processing logic allocates the processes that share resources to resources based on the resource information. In one embodiment, the resource information is updated to indicate that the allocated resources are no longer available for allocation (e.g., by deleting the resources from the resource information, by turning on a flag that indicates that the resources are unavailable, etc.). In one embodiment, the resources allocated to the processes that share resources are selected to minimize the distance between the allocated resources. In this embodiment, the distance between the resources can be determined using distance or layout data for the simultaneous multithreading system (e.g., in the resource information). Using the layout, routing, and/or location of the resources, processing logic can determine a distance from each available resource to another available resource. Processing logic can allocate the unscalable processes to the resources to minimize the distance between the allocated resources. For example, if process A and process B share a L2 cache, process A and process B are allocated to logical or virtual processors that are as close as possible to each other, such that process A and process B are more likely to share the L2 cache. Moreover, if process A and process B depend on each other for data or other resources, the performance of the processes can be improve due to the faster interconnection between the logical or virtual processors due to their physical closeness By minimizing the distance between the resources allocated for processes that share resources, the processes that share resources are more likely to share the resource that they have been determined to share, since resources that are close to each other are more likely to share a resource. Moreover, minimizing the distance can improve the speed and/or performance for the simultaneous multithreading system, since resources that are closer to each other have faster interconnections due to physical hardware implementations.

At block 440, processing logic allocates the remaining processes to resources based on the resource information. In one embodiment, the resource information is updated to indicate that the allocated resources are no longer available for allocation (e.g., by deleting the resources from the resource information, by turning on a flag that indicates that the resources are unavailable, etc.). Each remaining process is allocated to a resource by accessing the resource information to determine the available resources in the resource information and determining the best available resource to allocate each remaining process to.

In some embodiments, each remaining process is allocated to its own resource if there are sufficient resources in the resource information. In one embodiment, the available resource to allocate each remaining process to is selected to maximize the distance between the allocated resources. In this embodiment, the distance between the resources can be determined using distance or layout data for the simultaneous multithreading system (e.g., in the resource information). Using the layout, routing, and/or location of the resources, processing logic can determine a distance from each available resource to another available resource. Processing logic can allocate the remaining processes to the resources to maximize the distance between the allocated resources.

By allocating each remaining process to its own resource, the process will not have to share a resource with another unscalable process, and therefore is less likely to have to share a cache with another remaining process. The likelihood of cache thrashing can therefore be reduced since only one remaining process will likely be accessing the cache. In addition, by maximizing the distance between the resources allocated for the remaining processes, the remaining processes are less likely to have to share a cache, since resources that are far away from each other are less likely to share a cache. This distance maximization further reduces the likelihood of cache thrashing because only one remaining process will be accessing the cache. Moreover, because remaining processes are known to not share resources, resources that are close to each other can be used for other processes that do share resources.

If there are not sufficient resources available based on the resource information, more than one remaining process may be allocated to a resource. The distance between the resources selected can still be maximized as described above such that the resources selected will still be less likely to share a cache.

Figure 5:
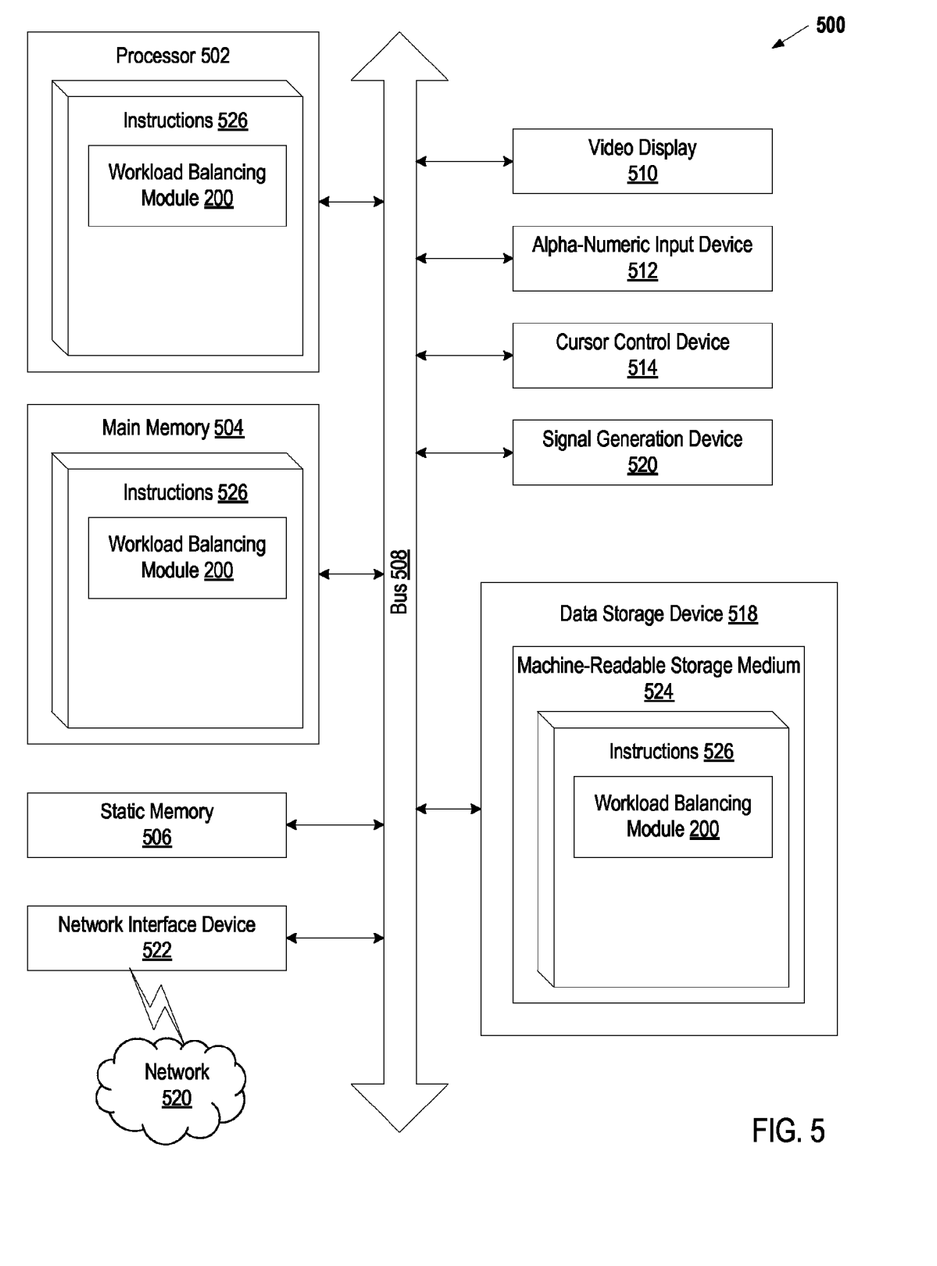
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 520 via the network interface device 522.

In one embodiment, the instructions 526 include instructions for a workload balancing module 200, and/or a software library containing methods that call an object detection/recognition engine. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   obtaining, by a simultaneous multithreading computing system, process information for the simultaneous multithreading computing system, wherein the process information indicates a plurality of processes associated with the simultaneous multithreading computing system;
   obtaining, by the simultaneous multithreading computing system, resource information for the simultaneous multithreading computing system, wherein the resource information indicates a plurality of available resources in the simultaneous multithreading computing system;
   determining, by the simultaneous multithreading computing system, that a process of the plurality of processes is unscalable on the simultaneous multithreading computing system in view of the process information;
   upon determining that the process is unscalable, selecting, by the simultaneous multithreading computing system, a resource to execute the unscalable process in view of the resource information, wherein the selected resource is selected in view of a physical distance from the selected resource to another resource in the simultaneous multithreading computing system, wherein the physical distance is based on the resource information; and upon determining that the selected resource is associated with a sibling resource, offlining, by the simultaneous multithreading computing system, the sibling resource associated with the selected resource such that no other process is allocated to the sibling resource, wherein the selected resource and the sibling resource share a cache.

2. The method of claim 1, further comprising determining that the selected resource is associated with the sibling resource in view of the resource information.

3. The method of claim 1, further comprising:
determining, by the simultaneous multithreading computing system, that another process from the plurality of processes is manually allocated in view of the process information; and
upon determining that the another process is manually allocated, selecting, by the simultaneous multithreading computing system, a resource dedicated to the another process in view of the resource information.

4. The method of claim 1, further comprising:
upon determining that a first process and a second process of the plurality of processes share a resource, selecting a first resource for the first process and second resource for the second process, wherein the selecting minimizes the physical distance between the first resource and the second resource in view of the resource information.

5. The method of claim 1, further comprising:
upon determining that a first process and a second process of the plurality of processes do not share a resource, selecting a first resource for the first process and second resource for the second process, wherein the selecting maximizes the physical distance between the first resource and the second resource in view of the resource information.

6. The method of claim 1, wherein the resource information comprises a topology of the simultaneous multithreading computing system and the process information further comprises an allocation policy for the simultaneous multithreading computing system.

7. A non-transitory computer readable storage medium having instructions that, when executed by a processing device, cause the processing device to perform operations comprising:
obtaining process information for a simultaneous multithreading computing system, wherein the process information indicates a plurality of processes associated with the simultaneous multithreading computing system;
obtaining resource information for the simultaneous multithreading computing system, wherein the resource information indicates a plurality of available resources in the simultaneous multithreading computing system;
determining that a process of the plurality of processes is unscalable on the simultaneous multithreading computing system in view of the process information;
upon determining that the process is unscalable, selecting a resource to execute the unscalable process in view of the resource information, wherein the selected resource is selected in view of a physical distance from the selected resource to another resource in the simultaneous multithreading computing system, wherein the physical distance is based on the resource information; and
upon determining that the selected resource is associated with a sibling resource, offlining the sibling resource associated with the selected resource such that no other process is allocated to the sibling resource, wherein the selected resource and the sibling resource share a cache.

8. The non-transitory computer readable storage medium of claim 7, wherein the instructions, when executed by the processing device, cause the processing device to perform further operations comprising:
determining that the selected resource is associated with the sibling resource in view of the resource information.

9. The non-transitory computer readable storage medium of claim 7, wherein the instructions, when executed by the processing device, cause the processing device to perform further operations comprising:
determining that another process from the plurality of processes is manually allocated in view of the process information; and
upon determining that the another process is manually allocated, selecting a resource dedicated to the another process in view of the resource information.

10. The non-transitory computer readable storage medium of claim 7, wherein the instructions, when executed by the processing device, cause the processing device to perform further operations comprising:
upon determining that a first process and a second process of the plurality of processes share a resource, selecting a first resource for the first process and second resource for the second process, wherein the selecting minimizes the physical distance between the first resource and the second resource in view of the resource information.

11. The non-transitory computer readable storage medium of claim 7, wherein the instructions, when executed by the processing device, cause the processing device to perform further operations comprising:
upon determining that a first process and a second process of the plurality of processes do not share a resource, selecting a first resource for the first process and second resource for the second process, wherein the selecting maximizes the physical distance between the first resource and the second resource in view of the resource information.

12. A computing device comprising:
a memory; and
a processing device coupled to the memory, wherein the processing device is configured to:
obtain process information for a simultaneous multithreading computing system, wherein the process information indicates a plurality of processes associated with the simultaneous multithreading computing system;
obtain resource information for the simultaneous multithreading computing system, wherein the resource information indicates a plurality of available resources in the simultaneous multithreading computing system;
determine that a process of the plurality of processes is unscalable on the simultaneous multithreading computing system in view of the process information;
upon determining that the process is unscalable, select a resource to execute the unscalable process in view of the resource information, wherein the selected resource is selected in view of a physical distance from the selected resource to another resource in the simultaneous multithreading computing system, wherein the physical distance is based on the resource information; and
upon determining that the selected resource is associated with a sibling resource, offline the sibling resource associated with the selected resource such that no other process is allocated to the sibling resource, wherein the selected resource and the sibling resource share a cache.

13. The computing device of claim 12, wherein the processor is further configured to:
- determine that the selected resource is associated with the sibling resource in view of the resource information.

14. The computing device of claim 12, wherein the processing device is further configured to:
- determine that another process from the plurality of processes is manually allocated in view of the process information; and
- upon determining that the another process is manually allocated, select a resource dedicated to the another process in view of the resource information.

15. The computing device of claim 12, wherein the processing device is further configured to:
- upon determining that a first process and a second process of the plurality of processes share a resource, selecting a first resource for the first process and second resource for the second process, wherein the selecting minimizes the physical distance between the first resource and the second resource in view of the resource information.

16. The computing device of claim 12, wherein the processing device is further configured to:
- upon determining that a first process and a second process of the plurality of processes do not share a resource, selecting a first resource for the first process and second resource for the second process, wherein the selecting maximizes the physical distance between the first resource and the second resource in view of the resource information.

* * * * *